United States Patent
Iancu

(10) Patent No.: US 6,795,452 B2
(45) Date of Patent: Sep. 21, 2004

(54) METHOD OF TRACKING TIME INTERVALS FOR A COMMUNICATION SIGNAL

(75) Inventor: Daniel Iancu, Pleasantville, NY (US)

(73) Assignee: Sandbridge Technologies, Inc., White Plains, NY (US)

( * ) Notice: Subject to any disclaimer, the term of this patent is extended or adjusted under 35 U.S.C. 154(b) by 291 days.

(21) Appl. No.: 10/157,938

(22) Filed: May 31, 2002

(65) Prior Publication Data

US 2003/0223392 A1 Dec. 4, 2003

(51) Int. Cl.[7] ............................................. H04L 7/033
(52) U.S. Cl. ...................... 370/515; 370/519; 375/142; 375/149
(58) Field of Search ................................ 370/342, 479, 370/508, 519, 350, 335, 503, 515; 375/146, 150, 326, 343, 142, 149, 327, 367, 376; 455/10, 18, 24, 242.1, 504

(56) References Cited

U.S. PATENT DOCUMENTS

| | | | |
|---|---|---|---|
| 5,734,674 A | * | 3/1998 | Fenton et al. ................ 375/150 |
| 5,754,583 A | | 5/1998 | Eberhardt et al. |
| 5,796,775 A | | 8/1998 | Aoyama |
| 5,828,694 A | | 10/1998 | Schipper |
| 5,867,525 A | | 2/1999 | Giallorenzi et al. |
| 5,926,502 A | | 7/1999 | Schilling |
| 6,078,611 A | | 6/2000 | La Rosa et al. |
| 6,198,765 B1 | | 3/2001 | Cahn et al. |
| 6,201,828 B1 | | 3/2001 | El-Tarhuni et al. |
| 6,269,075 B1 | | 7/2001 | Tran |
| 6,333,947 B1 | | 12/2001 | van Heeswyk et al. |
| 6,345,068 B1 | | 2/2002 | Molev-Shteiman |
| 6,345,078 B1 | | 2/2002 | Basso |
| 6,370,183 B1 | | 4/2002 | Newson et al. |
| 6,373,862 B1 | | 4/2002 | Kiasaleh |
| 6,381,262 B1 | * | 4/2002 | Ogino ........................ 375/147 |
| 2002/0141482 A1 | * | 10/2002 | Agami et al. ................ 375/147 |

FOREIGN PATENT DOCUMENTS

| | | |
|---|---|---|
| EP | 1 052 783 A2 | 11/2000 |
| WO | WO 0117118 A2 * | 3/2001 |

* cited by examiner

Primary Examiner—Chau Nguyen
Assistant Examiner—D. Duong
(74) Attorney, Agent, or Firm—Barnes & Thornburg LLP

(57) ABSTRACT

An improved tracking system, illustrated as a delayed lock loop. The time intervals of a communication signal are tracked by first sampling the communication signal. A standard and a sample, advanced relative to each other by i sample positions from a sample position representing an assumed arrival position $t_a$ of a time interval, are correlated over a correlating length of k samples. Also, the standard and a sample retarded relative to each other by the i sample positions from the assumed arrival time $t_a$ are also correlated over k samples. A timing error is determined from the correlations. A predication of the arrival time $t_p$ of the next interval is determined from the error. One or more of the correlation length k or the i sample position is modified based on the predicated arrival time $t_p$. The process is repeated using any of the modified correlation length k and/or sample position i. The timing error may also be used for descrambling and despreading.

17 Claims, 3 Drawing Sheets

METHOD OF TRACKING TIME INTERVALS FOR A COMMUNICATION SIGNAL

BACKGROUND AND SUMMARY OF THE INVENTION

The present invention relates generally to a method of tracking time intervals of a communication signal and, more specifically, to an improved delayed lock loop (DLL) method. Although the present invention will be described with respect to Code-Division Multiple Access (CDMA) systems, which is a coding scheme that requires them to be synchronized with the coding scheme in the processing, it is applicable to other signal transmissions.

In a CDMA transmission, each station's data stream is multiplied by binary bits, for example, pseudo noise (PN) codes. In order to decode the data stream at the receiver, the received signal must be correlated with the same PN codes. The received signal is subject to transmission delays and fading. If there are multi-path components, rake receivers are used, which correlate each of the multi-path components and recombine them. Thus, the transmission delay and fading of each rake receiver finger must be determined.

In addition to matching the appropriate PN codes, it is necessary to track the transmission delay of the components, as it may vary. Two of the predominant PN tracking configurations used are DLL and Tau-Dither Loop (TDL). Both are early-late gate-type loops where the received PN code is correlated with delayed and advanced versions of the receiver local code PN generator output to produce an error correcting characteristics.

Two typical examples are illustrated in FIGS. 1 and 2. The input signal is provided to an early and late correlator, which correlates the input sample signal to a PN code-generated signal. The output is provided through an output detector to a difference element. The difference or error is provided through a low pass filter (LPF) to a voltage control oscillator (VCO), which changes the phase of the PN generator. The output of the PN generator is the on-time PN sequence. The other example illustrated in FIG. 2 performs generally the same process, except that it adjusts the delay of the data to account for the difference or error. The input signal is provided through a variable delay, which is connected to the early correlator, the late correlator and an on-time correlator. The results are provided to accumulators, which is provided to a decision circuitry. The off-set or error is computed and provided through a loop filter to a delay adjust, which adjusts the variable delay input of the sampled, received signal or data.

These delayed lock loops or correlators are run for a fixed correlation length, and the sample position or time of the early and late correlators compared to the on-time correlators are generally fixed. This leads to a large number of calculations and consumption of power.

The present invention offers an improved tracking system, illustrated as a delayed lock loop. The time intervals of a communication signal are tracked by first sampling the communication signal. A standard and a sample, advanced relative to each other by i sample positions from an assumed sample position representing the assumed arrival position $t_a$ of a time interval, are correlated over a correlating length of k samples. Also, the standard and a sample, retarded relative to each other by the i sample positions from the assumed sample position of $t_a$, are also correlated over k samples. A timing error is determined from the correlations. A prediction of the predicted arrival time $t_p$; of the next interval is determined from the error. One or more of the correlation length k or the i sample position is modified based on the predicted arrival time $t_p$. The process is repeated using any of the modified correlation length k and/or sample position i.

The method of determining the correlation error includes calculating an estimated arrival time $t_o$ of the present interval. This estimated arrival time $t_o$ is used to predict the next arrival time $t_p$. The estimated time $t_o$ is a function of the magnitude and the spacing of the maximum and minimum error. The prediction of the next arrival time $t_p$ includes setting the assumed arrival time $t_a$ to the previous assumed arrival time $t_a$, if the predicted arrival time $t_p$ differs from the previous assumed arrival time $t_a$ by less than a given value. The next assumed arrival time $t_a$ is set to the previous assumed arrival time $t_a$ plus or minus an increment, if the predicted arrival time $t_p$ differs from the previous assumed arrival time to by more than a given value. Preferably, the estimated arrival times $t_o$ are passed through a predictor type filter, and the results are used to predict the next arrival time $t_p$.

The correlation length k may be in a range of 256 to 2048 samples and may be modified by a range of 32 to 128 samples. The correlation length k will be changed depending upon whether the variance of the estimated arrival time $t_o$ from the assumed arrival time $t_a$ is within or without a tolerance window. The tolerance levels correspond to the AWGN noise variances.

The method also includes determining if the error is above a threshold. If it is above a threshold, then the data samples timing of standard is interpolated, and the interpolated timing is used to decode the communication signal. If it is not above the threshold, the standard timing is used to decode the communication signal. The method may be used with CDMA communication signals and may be used in rake receivers for each finger. Time intervals may be frames, slots or other time intervals of a communication signal. Preferably, the method is carried out in a software implementation on a signal processor.

These and other aspects of the present invention will become apparent from the following detailed description of the invention, when considered in conjunction with accompanying drawings.

DETAILED DESCRIPTION OF THE PREFERRED EMBODIMENTS

Figure 1:
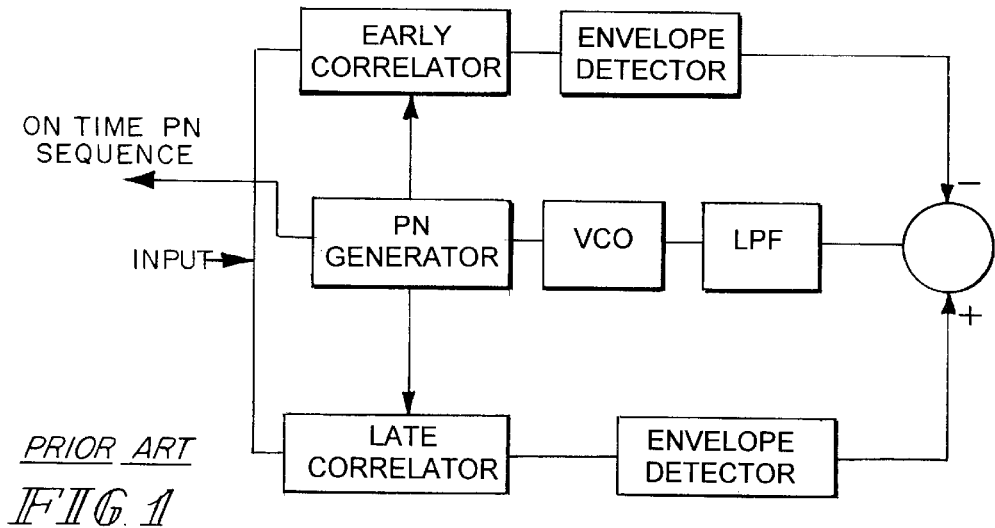
FIG. 1 is a block diagram of a delayed lock loop of a prior art.
Figure 2:
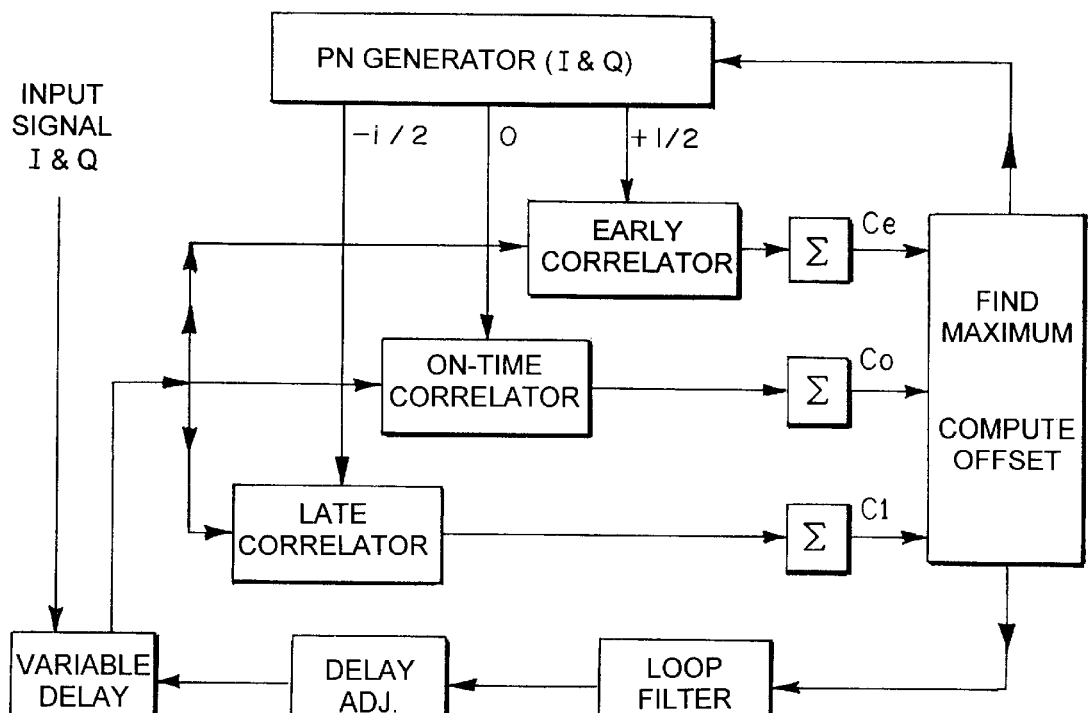
FIG. 2 is a block diagram of another delayed lock loop of a prior art.
Figure 3:
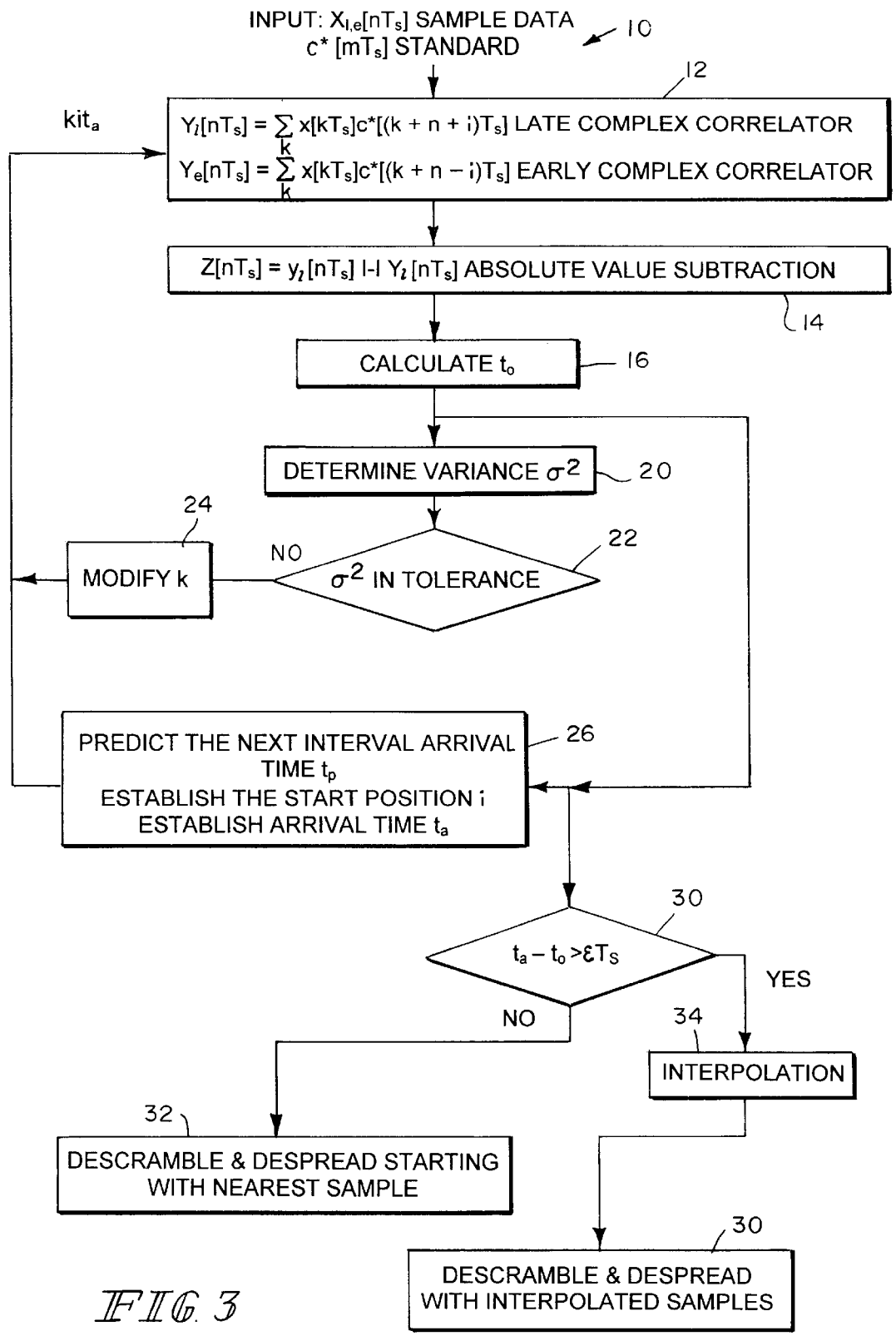
FIG. 3 is a flow chart of the method of tracking time intervals according to the principles of the present invention.

FIG. 3 shows a flow diagram for tracking time intervals of a communication signal. The inputs at 10 to the correlators 12 are data or signals $x_{e,l}[nT_s]$ and standard $c^*[mT_s]$. The input signal or data $x_{e,l}[nT_s]$ may be a complex sequence, for example, in-phase (I) and quadrature (Q) components of a communication signal, for example, CDMA. The standard $c^*[mT_s]$ is the complex conjugate of $c[mT_s]$ which is a PN sequence of the transmission. $T_s$ is the sampling time, and n is the data or sample number.

The late complex correlator and an early complex correlator 12 correlate over a correlation length k. The start position or the amount of the early and/or late from the time position $t_a$ is i. As will be described below, the advance or retard position i is changed depending upon the correlation error, as is the correlation length k. Reducing the start position i and the correlation length k allows substantial savings in time and power required to perform the correlations. The correlators of step 12 are well-known and not described in detail. The correlations $y_l[nT_s]$ and $y_e[nT_s]$ are then used to calculate the correlation error $Z[nT_s]$ at 14. This is an absolute value subtraction.

Figure 4:
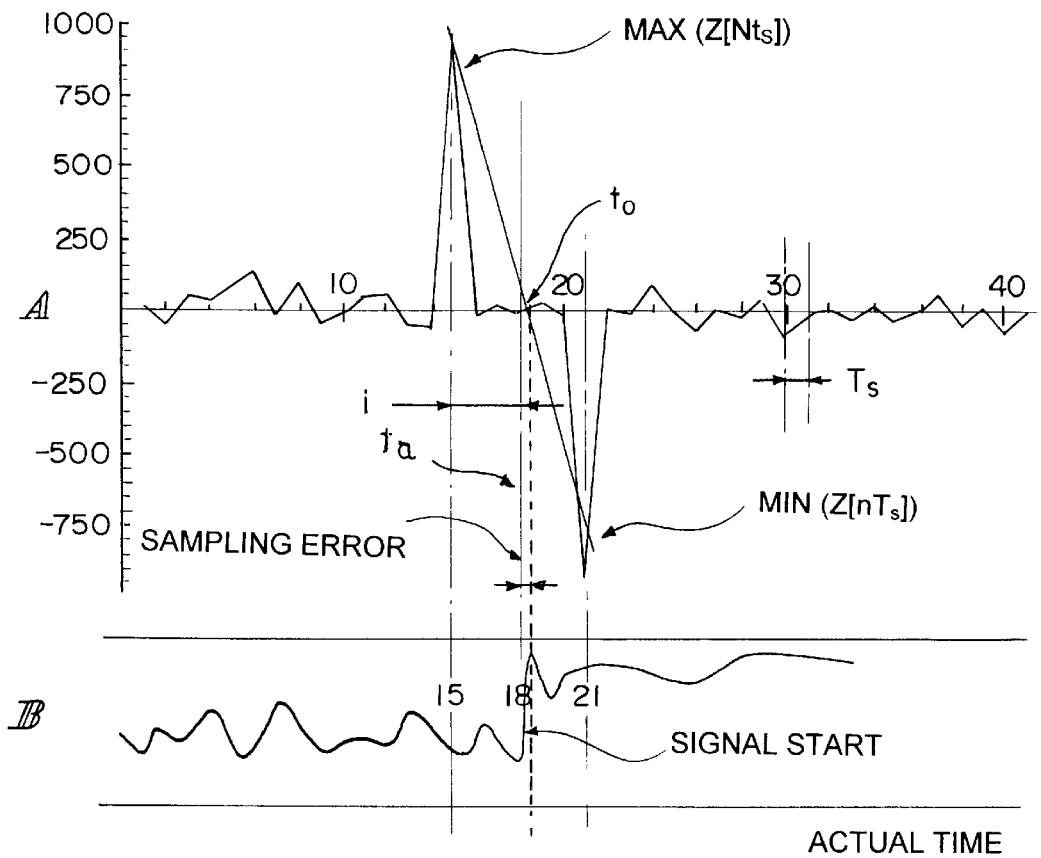
FIG. 4A is a graph of the correlation error of a received signal.
FIG. 4B is a graph of the received signal.

Next, the correlation error is $Z[nT_s]$ used to calculate an estimate of the arrival time $t_o$ of the current time interval. FIG. 4B illustrates an example of the actual analog signal. As illustrated in FIG. 4A, the correlation error proceeds vacillating around zero until it reaches a $Max(C[nT_s])$ shown at approximately time 15 within the interval. This is followed by a $Min(C[nT_s])$ shown at approximately time 21 within the interval. In between, there is an estimated arrival time $t_o$ of the present interval which is the time of zero correlation error. The assumed arrival time of the current interval $t_a$, as shown in FIG. 4A, is the sampling time position. The sample error is the difference between the assumed arrival time $t_a$ and the estimated arrival time $t_o$.

The estimated present arrival time $t_o$ may be calculated as follows:

$$t_o = \frac{-Max(Z[nT_s])}{Min(Z[nT_s]) - Max(Z[nT_s])}[Position(Min(Z[nT_s])) - Position(Max(Z[nT_s]))] + Position(Max(Z[nT_s]))]$$

The estimated arrival time $t_o$ of the present interval from 16 is provided to build a statistical data base at 20. Statistical data base 20 consists of determining the variants of the estimated arrival time $t_o$ over a specific number of intervals. This may be, for example, ten time intervals. Each new estimated arrival time $t_o$ produces new variance and a new mean value. Next, it is determined whether the variance $\sigma^2$ is in tolerance at 22. If it is not, the correlation length k is modified at 24 and provided to the correlators at 12. One method of determining if the variants $\sigma^2$ is in tolerance and modifying k is as follows:

$$k = k + \alpha N$$

where N is the increment of the correlation length k and $\alpha$ is defined as follows:

| | | |
|---|---|---|
| $\alpha = 0$ | for | $\sigma_1^2 \leq \sigma^2 \leq \sigma_2^2$ |
| $\alpha = -1$ | for | $\sigma^2 \leq \sigma_1^2$ |
| $\alpha = +1$ | for | $\sigma^2 \geq \sigma_2^2$ | where $\sigma_1^2$ and $\sigma_2^2$ are specified variance thresholds.

The thresholds of $\sigma_1^2$ and $\sigma_2^2$ correspond to AWGN noise variances. For example, $\sigma_1^2$ may equal 0.0018, and $\sigma_2^2$ may equal 0.0062, which corresponds to the AWGN noise variances 0.5 and 1, respectively. The correlation length k may be in the range of 256 to 2048 samples, and the increment N may be in the range of 32 to 128 samples.

The estimated present arrival time $t_o$ is also used to predict the next interval arrival time $t_p$ and to establish the starting position i or the amount of advance or retard at 26 for the correlates 12 from an assumed sample time position $t_a$. Part of the prediction of the next interval arrival time $t_p$ at 26 includes passing the estimated present arrival times $t_o$ through predictive type filters, one step predictors or Kalman predictors. The results are then used to predict the next arrival time $t_p$. One method of predicting arrival time $t_p$ is using the methods described in A. Papoulis, *Probability, Random Variables, and Stochastic Processes*, McGraw-Hill, Inc., 1991, 14.2.

Once the next arrival time $t_p$ is predicted, the early/late correlation starting point i is determined. Depending on the difference of the predicted next arrival time $t_p$ the present assumed arrival time $t_a$, the value of the starting points i may be changed or the assumed arrival time $t_a$ for the next interval can be changed. Using FIG. 4A as an example, if the predicted next arrival time $t_p$ is closer to time position 17 that the present assumed arrival time $t_a$ of 18 and the original starting point i was 3, the starting point i could be increased to 4 such that at least the total separation of 6 is maintained about the time position 17 or the assumed arrival time $t_a$ may be changed from 18 to 17 and i stays at 3.

The timing error $t_a - t_o$ is also used in demodulation. The timing error is tested to see if it is greater than a percentage of the sample time $T_s$. If it is not greater, then the assume arrival time $t_a$ is used to descramble and despread starting with the nearest sample at 32. If it is greater, then an interpolation is performed at 34, and the interpolated time is used to descramble and despread at 36. For example, if the assumed arrival time $t_a$ is 18 and the timing error is beyond the pre-set limit, the start time may be increment by 0.5 and set to 18.5. The limit may be, for example, 25 percent of the sampling time $T_s$. Interpolation may be performed using one of the different methods described by E. Kreyszig in *Advanced Engineering Mathematics*, John Willey and Sons, 1972, 18.4.

Figure 5:
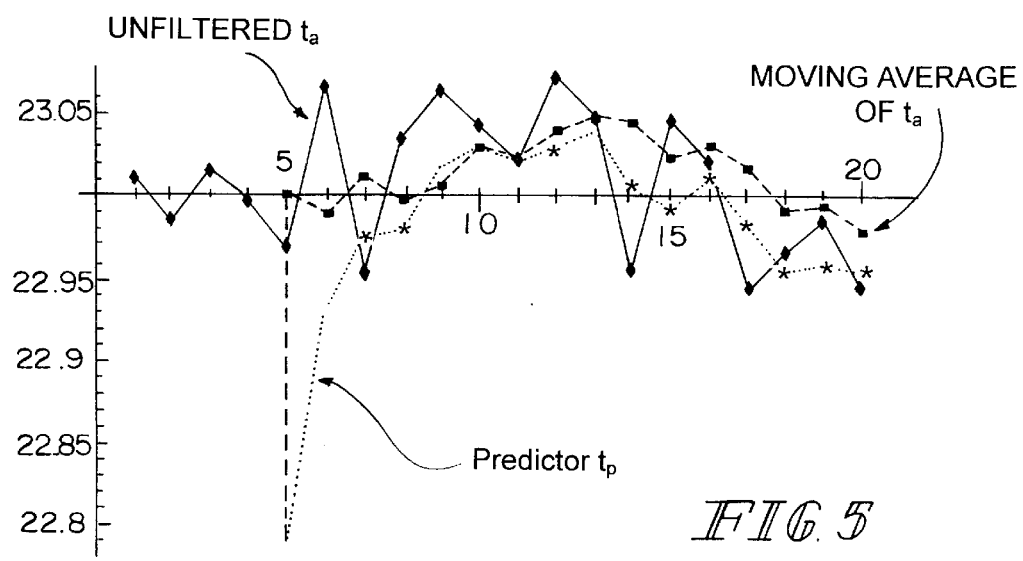
FIG. 5 depicts three graphs of the unfiltered assumed arrival time $t_a$, predicted arrival time $t_p$ and the moving average of the assumed next arrival time $t_a$ as a function of number samples.

FIG. 5 illustrates the unfiltered assumed arrival time $t_a$ compared to the predicted arrival time $t_p$. The graph of the moving average of the assumed arrival time $t_a$ is provided to show the quality of the predicted zero time $t_o$.

The present method is performed in software on known devices and delayed lock loops.

Although the present invention has been described and illustrated in detail, it is to be clearly understood that this is done by way of illustration and example only and is not to be taken by way of limitation. The spirit and scope of the present invention are to be limited only by the terms of the appended claims.

What is claimed:

1. A method for tracking time intervals of a communication signal, the method comprising:

sampling the communication signal at a rate of $T_s$;

correlating, over correlating length k samples, a standard and a sample advanced relative to each other by i sample positions from an assumed sample position representing an assumed arrival time $t_a$ of a time interval;

correlating, over k samples, the standard and a sample retarded relative to each other by the i sample positions from the assumed time $t_a$;

determining a timing error from the correlations;

predicting, from the error, a predicted arrival time $t_p$ of the next interval;

modifying one or more of k and i based on the predicted arrival time $t_p$; and performing the correlating and subsequent steps using any of the modified k and i.

2. The method according to claim 1, where determining the error includes calculating an estimated arrival time $t_o$ of the current time interval; and using the estimated arrival time $t_o$ to predict the next arrival time $t_p$.

3. The method according to claim 2, wherein the estimated arrival time $t_o$ is calculated as follows:

$$t_o = \frac{-\text{Max}(Z[nT_s])}{\text{Min}(Z[nT_s]) - \text{Max}(Z[nT_s])} [\text{Position}(\text{Min}(Z[nT_s])) - \text{Position}(\text{Max}(Z[nT_s]))] + \text{Position}(\text{Max}(Z[nT_s]))]$$

wherein $Z[nT_s]$ is the correlation error.

4. The method according to claim 2, wherein predicating the next arrival time $t_p$ includes setting the next assumed arrival time $t_a$ to the present assumed arrival time $t_a$ if the present predicted arrival time $t_p$ differs from the assumed arrival time $t_a$ by less than a given value.

5. The method according to claim 4, wherein predicating the next arrival time $t_p$ includes setting the next assumed arrival time $t_a$ to the present assumed arrival time $t_a$ plus or minus an increment if the predicted arrival time $t_p$ differs from the present assumed arrival time $t_a$ by more than the given value; and using the next assumed arrival time $t_a$ for correlating.

6. The method according to claim 2, wherein the present estimated arrival times $t_o$ are passed through a predictor type filter, one step predictor or Kalman predictor, and the results are used to predict the next arrival time $t_p$.

7. The method according to claim 1, wherein the correlation length k is in the range of 256 to 2048 samples and is modified by a range of 32 to 128 samples.

8. The method according to claim 2, wherein the correlation length k will be changed as follows:

$$k = k + \alpha N$$

where N is the increment of the correlation length k, and $\alpha$ is defined as follows:

| | | |
|---|---|---|
| $\alpha = 0$ | for | $\sigma_1^2 \leq \sigma^2 \leq \sigma_2^2$ |
| $\alpha = -1$ | for | $\sigma^2 \leq \sigma_1^2$ |
| $\alpha = +1$ | for | $\sigma^2 \geq \sigma_2^2$ | where $\sigma^2$ is the variance of the estimated arrival time $t_o$, and $\sigma_1^2$ and $\sigma a_2^2$ are specified variance thresholds.

9. The method according to claim 8, wherein $\sigma_1^2$ and $\sigma_2^2$ correspond to AWGN noise variances.

10. The method according to claim 1, wherein the standard for the correlation is a pseudo noise code.

11. The method according to claim 1, wherein the communication signal is CDMA.

12. The method according to claim 1, wherein the method is performed in a rake receiver for each finger.

13. The method according to claim 1, including determining if the error is above a threshold; interpolating the data samples timing of the standard if the error is above the threshold; and using the timing of the standard or the timing of the interpolated standard, if interpolated, to decode the communication signal.

14. The method according to claim 13, wherein the threshold is a percentage of the sampling rate $T_s$.

15. The method according to claim 1, wherein the interval is one of a frame or slot of a communication signal.

16. A receiver performing the method of claim 1.

17. The receiver of claim 16, wherein the receiver includes software for performing the method of claim 1.

* * * * *

UNITED STATES PATENT AND TRADEMARK OFFICE
CERTIFICATE OF CORRECTION

PATENT NO.         : 6,795,452 B2
APPLICATION NO. : 10/157938
DATED                  : September 21, 2004
INVENTOR(S)        : Daniel Iancu It is certified that error appears in the above-identified patent and that said Letters Patent is hereby corrected as shown below:

In Figure 3, at the bottom on the right, above the Box containing DESCRAMBLE & DESPREAD WITH INTERPOLATED SAMPLES it is requested to change identifying numeral "30" to --36--.

In Column 2, in lines 58-59, it is requested to change " $x_{e,l}[nT_s]$ "

to -- $x_{l,e}[nT_s]$ --.

In Column 3, in lines 13, it is requested to change " $_a MAX(C[nT_s])$ "

to -- $_a MAX(Z[nT_s])$ --.

UNITED STATES PATENT AND TRADEMARK OFFICE
CERTIFICATE OF CORRECTION

PATENT NO. : 6,795,452 B2
APPLICATION NO. : 10/157938
DATED : September 21, 2004
INVENTOR(S) : Daniel Iancu It is certified that error appears in the above-identified patent and that said Letters Patent is hereby corrected as shown below:

In Column 3, in lines 15, it is requested to change " $_a Min(C[nT_s])$ "

to -- $_a Min(Z[nT_s])$ --.

Signed and Sealed this

Twelfth Day of August, 2008

JON W. DUDAS
*Director of the United States Patent and Trademark Office*